United States Patent
Daures et al.

(10) Patent No.: US 12,453,475 B2
(45) Date of Patent: Oct. 28, 2025

(54) METHOD AND DEVICE FOR MONITORING FLUORESCENCE DIFFUSION IMAGES EMITTED AT THE SURFACE OF A BIOLOGICAL TISSUE AND AUTOMATICALLY DETERMINING THE VARIATIONS BETWEEN FLUORESCENCE IMAGES

(71) Applicant: FLUOPTICS, Grenoble (FR)

(72) Inventors: Anthony Daures, Clichy (FR); Philippe Rizo, La Tronche (FR)

(73) Assignee: FLUOPTICS, Grenoble (FR)

( * ) Notice: Subject to any disclaimer, the term of this patent is extended or adjusted under 35 U.S.C. 154(b) by 1234 days.

(21) Appl. No.: 16/757,838

(22) PCT Filed: Oct. 15, 2018

(86) PCT No.: PCT/FR2018/052553
§ 371 (c)(1),
(2) Date: Mar. 22, 2021

(87) PCT Pub. No.: WO2019/081833
PCT Pub. Date: May 2, 2019

(65) Prior Publication Data
US 2022/0313092 A1    Oct. 6, 2022

(30) Foreign Application Priority Data
Oct. 26, 2017    (FR) ...................................... 1760109

(51) Int. Cl.
*A61B 5/00*    (2006.01)
*A61B 5/02*    (2006.01)
*A61B 5/0275*    (2006.01)
*A61B 90/00*    (2016.01)
*G01N 21/64*    (2006.01)

(52) U.S. Cl.
CPC .......... *A61B 5/0071* (2013.01); *A61B 5/0275* (2013.01); *A61B 5/489* (2013.01); *A61B 90/361* (2016.02); *G01N 21/64* (2013.01); *A61B 5/02042* (2013.01)

(58) Field of Classification Search
CPC ..... A61B 5/0071; A61B 5/0275; A61B 5/489; A61B 90/361; A61B 5/02042; A61B 90/36; G01N 21/64
See application file for complete search history.

(56) References Cited

U.S. PATENT DOCUMENTS

2006/0013454 A1* 1/2006 Flewelling .............. G06T 11/00
382/128
2010/0094136 A1  4/2010 Nakaoka et al.
(Continued)

FOREIGN PATENT DOCUMENTS

WO    2008/081659 A1    7/2008
WO    2009127972 A2    10/2009
WO    2009127972 A3    1/2010

*Primary Examiner* — Serkan Akar
(74) *Attorney, Agent, or Firm* — Occhiuti & Rohlicek LLP; Frank R. Occhiuti; Faustino A. Lichauco

(57) ABSTRACT

A method for monitoring diffusion of a fluorescent marker within a region of biological tissue includes observing the marker's diffusion in a series of images captured by a camera and determining whether to display an image based at least in part on the evolution of the marker's spatial distribution as it perfuses through the tissue.

18 Claims, 3 Drawing Sheets

(56) References Cited

U.S. PATENT DOCUMENTS

| | | |
|---|---|---|
| 2010/0305454 A1 | 12/2010 | Dvorsky et al. |
| 2012/0328178 A1* | 12/2012 | Remiszewski .......... G06T 11/60 |
| | | 382/133 |
| 2017/0084012 A1 | 3/2017 | Walle-Jensen et al. |
| 2019/0133502 A1* | 5/2019 | Gomi ................... A61B 5/0071 |

* cited by examiner

METHOD AND DEVICE FOR MONITORING FLUORESCENCE DIFFUSION IMAGES EMITTED AT THE SURFACE OF A BIOLOGICAL TISSUE AND AUTOMATICALLY DETERMINING THE VARIATIONS BETWEEN FLUORESCENCE IMAGES

RELATED APPLICATIONS

This application is the national-stage entry under § 371 of international application PCT/FR2018/052553, filed on Oct. 15, 2018, which claims the benefit of the Oct. 26, 2017 priority date of FR1760109, the content of which is herein incorporated by reference.

FIELD OF INVENTION

The invention relates to the field of medical imaging. More particularly, the invention relates to a method and device for measuring fluorescence in biological tissue.

BACKGROUND

Fluorescence imaging makes it possible to provide pre-operative information regarding perfusion in biological tissues, in particular human tissues. For certain medical indications, it may be advantageous to know the rate at which a fluorescent signal changes as well as its amplitude. This promotes the ability to evaluate the overall perfusion of the tissue and to identify possible venous or arterial problems.

SUMMARY

An object of the invention that of allowing the practitioner to monitor the diffusion of a marker while being able to disregard time as much as possible.

This object is achieved in part by monitoring the diffusion of a fluorescent marker within a biological tissue over time. Such a method includes monitoring the marker's diffusion by measuring an area in which fluorescence has appeared. Some practices include comparing this area with an area that corresponds to a larger region-of-interest. Some practices also include comparing a measured fluorescence signal in a region in which it has already become observable with that in a region in which it has yet to appear and providing, to the practitioner, information concerning the state of the marker's diffusion only at selected times, namely those times at which a significant change has been observed in the proportion of the tissue in which a signal representative of fluorescence has reached a particular level.

In one aspect, the method includes using a camera to execute at least one operation that includes acquiring fluorescence images by capturing and storing at least one image that shows fluorescence within a region of biological tissue. Each fluorescence image corresponds to a set of pixels. Associated with each image is a fluorescence signal that has different relative values at different portions of the image. The relative value of this signal at each portion within the image represents the intensity of fluorescence emission at that point. Each portion of the image is associated with at least certain pixels. Hence, the value of this signal within a portion of the image is associated with a pixel set, which can include one or more pixels. This pixel set is, in turn, associated with a particular region of the biological tissue in which the fluorescence is being monitored.

As the marker perfuses, the method includes automatically determining whether or not it is worthwhile to display all or part of a candidate image. This depends on whether or not the candidate image has changed significantly relative to the most recently displayed image. To do this, the method includes the step of comparing images, and in particular, the areas in which the marker has diffused in those images. This provides a basis for observing whether the change in the spatial distribution of the marker throughout the tissue has changed sufficiently so that it is worthwhile displaying the candidate image.

The method disclosed herein thus provides a way to automatically choose which images to display in such a way that the displayed images show particular milestones of the temporal and spatial distribution of the marker without burdening the practitioner with images that show little or no change and without skipping over times at which rapid evolution is taking place. This is achieved by measurement of areas within the image in which fluorescence is visible with a predetermined intensity. Circuitry for implementing the method automatically processes fluorescence images so that they have the potential to be displayed. But actual display is not assured for each of these images. The circuitry will suppress display of selected ones of these images and only display those that would be useful to the practitioner. The choice is made based on the spatial extent of the marker within the image. As a result, the circuitry displays only those images in which the spatial distribution of the marker has changed significantly enough to be of interest to the practitioner. This avoids displaying a sequence of images in which there is little change between consecutive images. It also avoids displaying a sequence of images in which too great a variation has occurred between the images.

The method thus includes the automatic suppression of the display of those images for which the spatial distribution of marker has not changed very much relative to the previously displayed image. In general, this results in the display of more images in the initial phase of diffusion, where the evolution of the marker's spatial distribution is at its greatest, and fewer images as the spatial distribution approaches a steady state.

As used herein, circuitry includes analog or digital circuitry, including programmable digital circuitry, such as a digital computer. In all cases, the circuitry is a physical device that consumes energy and generates waste heat. In those cases in which the circuitry includes a digital computer, the method results in a technical improvement in the operation of the computer because it makes the computer able to do what it was previously unable to do. In general, causing a machine to do what it could previously not do amounts to a technical step that results in a technical improvement to the operation of that machine. This general principle is not limited to machines of the industrial age but is equally applicable to machines of the sort exemplified by a digital computer that has been modified through suitable programming to do what it could never do before.

Typical circuitry for implementing the method includes a collection of switches that are used to cause fluctuations in voltage within the circuitry, the fluctuations occurring at intervals defined by a clock circuit. During operation, at each clock pulse, voltages are presented to inputs of selected logic gates and allowed to percolate through the logic gates. The resulting output voltages are connected to switches, and typically, to gate terminals of FETs. By suitably orchestrating these voltages, it is possible to cause the circuitry to carry out the desired function. Each set of voltages can thus be viewed as an "instruction." A set of sets of voltages, i.e., a set of instructions, can is called a "program." In those cases in which the instructions are integrated into the circuitry, the program is referred to as "firmware." In other cases, where the program is separable from the circuitry so that it can easily be modified, the program is referred to as "software."

None of the foregoing steps are carried out entirely in the human mind and all of the steps are carried out in a non-abstract manner.

The claimed subject matter results in a technical improvement in a processing system. The improvement arises in part because the processing system is able to carry out a procedure that it could not otherwise carry out. The instructions used for causing a processor to carry out these instructions exist on a manufacture that comprises tangible and non-transitory media. Alternatively, the instructions can be carried out using hardware, firmware, or a combination of both. In either case, the execution of instructions is a physical process that consumes energy and generates waste heat. The methods described herein are restricted solely to non-abstract implementations. No abstract implementations have been described. Accordingly, the claims only read on non-abstract implementations. Anyone who construed the claim as if it read on an abstract implementation would therefore be construing the claim incorrectly. As used herein, Applicant, acting as his own lexicographer, hereby defines the term "non-abstract" and its cognates to mean the converse of "abstract," where "abstract" means what the Supreme Court and lower courts have construed it to mean as of the filing of this application.

BRIEF DESCRIPTION OF THE DRAWINGS

Other features and advantages of the invention will become apparent on reading the following detailed description, and from the appended drawings. In these drawings.

DETAILED DESCRIPTION

Figure 1:
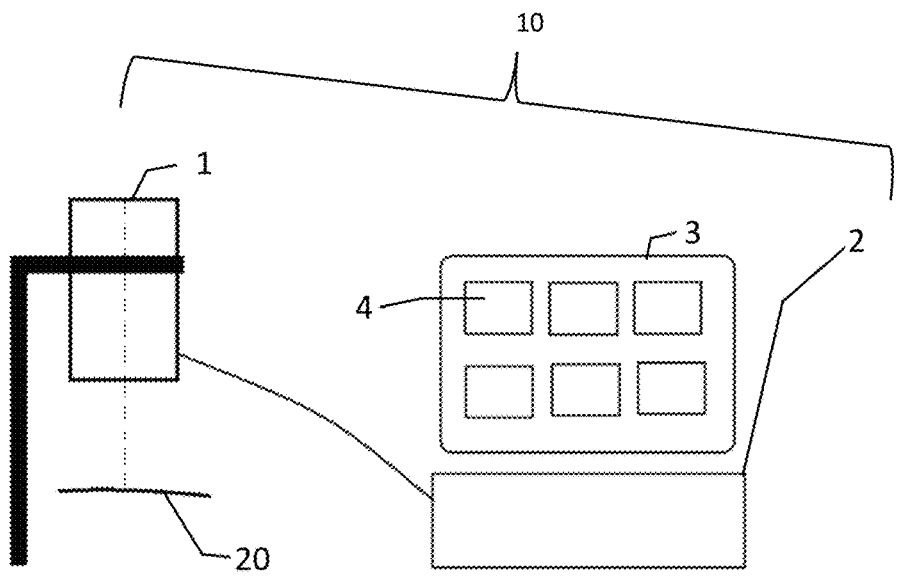
FIG. 1 shows an image-acquisition device.

Referring to FIG. 1, a device 10 for monitoring the fluorescence emitted at the surface of a biological tissue 20 includes a probe 1 that forms an image from fluorescence light that is generated by a fluorophore and that is emitted from the surface of the region of biological tissue 20.

An arm 5 supports the probe 1 so that the probe 1 is at a constant distance from the tissue 20. In general, there may be movement as a result of breathing. However, the alignment of the images relative to each other makes it possible to correct for artifacts caused by such movement. It should be noted that the method as described herein allows use of the probe 1 with or without arms.

Embodiments include those in which the probe 1 comprises a camera for capturing images that result from fluorescence. Examples of such images are those formed in in the near infrared. In such cases, a suitable camera is one that has a sensor suitable for capturing images in the near infrared. In general, the camera has a sensor that is sensitive to whatever wavelengths are being emitted by the fluorescent marker in use.

As used herein, "fluorescence image" refers to an image of a fluorescence signal that is emitted from the surface of the biological tissue 20 that is being observed. The fluorescence image is captured using the camera.

As used herein, a "current image" or a "context image" is an image that has been extracted, directly, without integration or summation with one or more other images, from a video produced using the probe's camera.

In some embodiments, the probe 1 comprises first and second cameras. The first camera is sensitive to the wavelengths used for fluorescence and the second camera is a camera that senses visible light. In this case, the current images are taken either in the range of wavelengths detected by the fluorescence camera using a light source in the range of wavelengths detected by the fluorescence camera, for example using a laser source or light-emitting diode source emitting in the near infrared or in the visible range. The probe 1 also includes an excitation source. A suitable excitation source is a laser or LED that emits excitation radiation for exciting the fluorophore or marker.

The probe 1 connects to a circuitry 2. The circuitry 2 records and stores images captured by each camera and processes the fluorescence images and, optionally, the current images. The circuitry 2 then causes the images to be shown on a display 3 to which it connects. The display 3, which can be a screen, displays images 4 that result from processing steps described herein.

A method for acquiring images includes intravenously injecting a fluorescent tracer or marker, such as a fluorophore. Such an injection delivers a large quantity of the relevant substance in a short time. The excitation source remains active. Thus, the probe's fluorescence camera then receives and records fluorescence images over time.

The resulting fluorescence signal is then provided to the circuitry 2, which carries out an analysis of the recorded fluorescence images in real time. This analysis determines the beginning of the rise of the fluorescence signal, and in particular, a starting time $T_0$ at which the fluorescence signal begins to increase. The circuitry 2 then sums fluorescence images from the starting time and normalizes the image resulting from the summation relative to the maximum intensity in the image. Having done so, the circuitry 2 determines a percentage of pixels with which a signal greater than or equal to a predetermined threshold is associated.

In the image resulting from the summation, if the percentage of the number of pixels associated with a signal greater than or equal to a predetermined threshold varies by an extent that is greater than or equal to a predefined or precalculated threshold, the circuitry 2 causes the display of an image that resulted from the summation. The relevant variation can be either an increase or a decrease in the percentage. In some embodiments, the circuitry 2 also colorizes the normalized image before actually displaying it.

An example of the method carried out using the disclosed apparatus is described below in more detail.

In the discussion that follows: $T_0$ is the time at which one is first able to observe the start of an increase in the marker's diffusion through the tissue; $\Delta T$ represents the time interval corresponding to a duration of an acquisition period; F is the frequency at which the camera acquires images; $I_{Ref}$ is a reference image that is calculated at the start of acquisition before $T_0$ and that can be subtracted from one or more newly acquired images after it has been calculated; $I_i(Y_0)$, where i is an integer greater than or equal to 1, represents an image obtained before $T_0$ or at time $T_0$; $I'(Y_0)$ is an integrated image obtained by summing several images $I_i(Y_0)$; $I'_{NORM}(Y_0)$ is an image obtained by summing several images $I_i(Y_0)$; normalized by its own maximum; $I_i(Y_1)$, where i is an integer greater than or equal to 1, is an image acquired after $T_0$ and summed with the integrated image already obtained $I'(Y_0)$ or $I'(Y_1)$; $I'(Y_1)$ is an integrated image obtained by summing the image $I'(Y_0)$ with one or more images $I_i(Y_1)$; $I'_{NORM}(Y_1)$ is an image $I'(Y_1)$ normalized by its own maximum and having a proportion higher than or equal to $Y_1$, of the number of pixels corresponding to a relative intensity of the signal that is higher than a predefined threshold value X%; $Y_0$ is a proportion of pixels in $I'_{NORM}(0)$ corresponding to a relative intensity of the fluorescence signal that is higher than a predefined threshold value of X%; and $Y_j$, $Y_j+1$, ..., $Y_z$ represent proportions of pixels corresponding to a relative intensity of the fluorescence signal that is higher than a predefined threshold value of X%, in successive integrated and normalized images $I'_{NORM}(Y_j)$, $I'_{NORM}(Y_j+1)$, ..., $I'_{NORM}(Y_z)$.

An exemplary practice of the method begins with injection of a bolus of a fluorophore. An example of a suitable fluorophore is indocyanine green.

Figure 3:
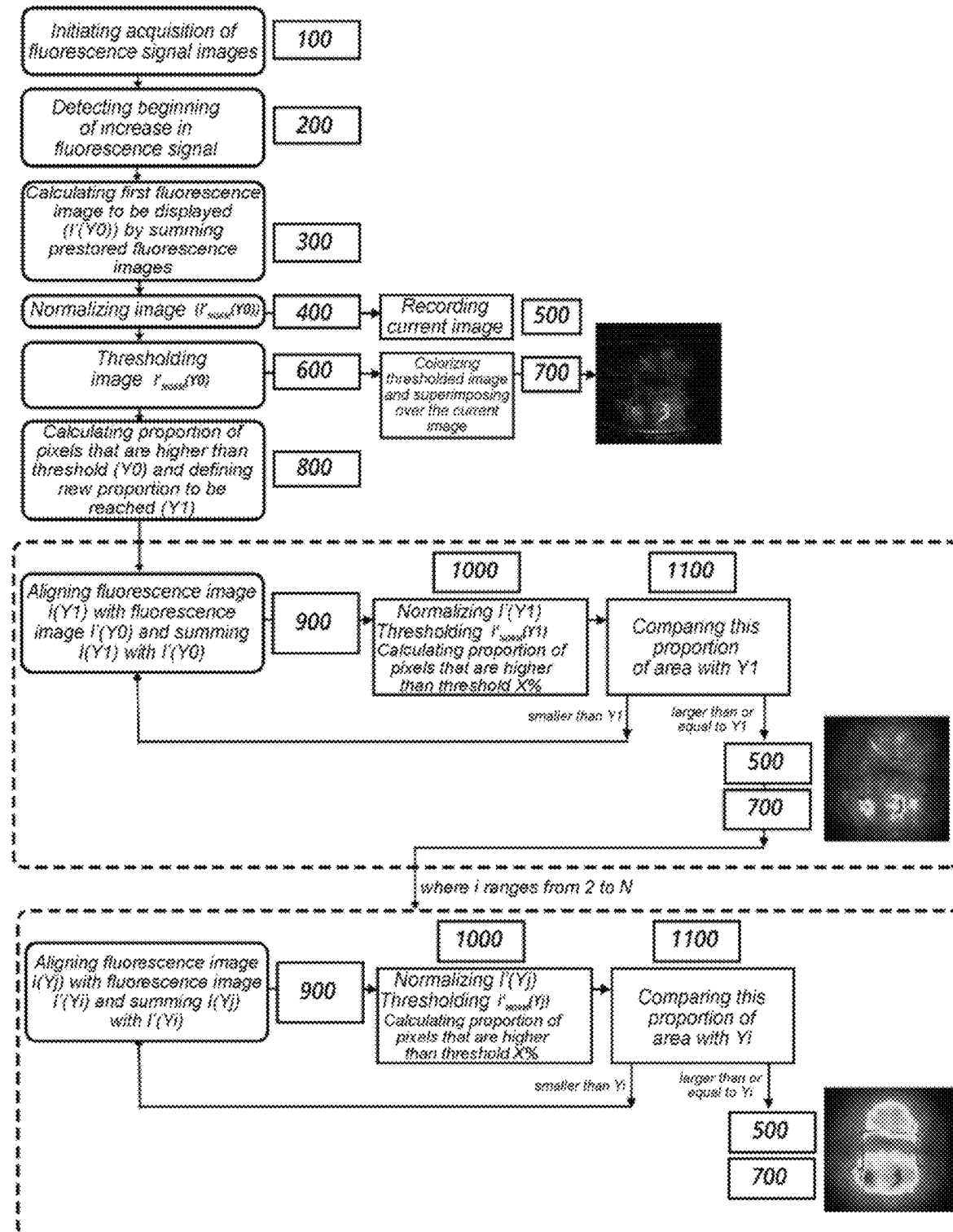
FIG. 3 shows a sequence of steps implemented to view the regions with potential perforators.

Referring now to FIG. 3, before or at the time of fluorophore injection, an acquisition operation 100 begins. At this point, the probe's fluorescence camera continuously records a video image. Images are extracted from the video at a particular extraction frequency. These images do not necessarily include the fluorescence signal. Data corresponding to these images is then transmitted to the circuitry 2.

The process continues with storage or recordation of the extracted images. Some practices feature storing the extracted images in a circular buffer. Such a buffer has a fixed size. This fixed size is chosen to correspond to a predefined number of stored images. For example, if the images are extracted at twenty images per second, the circular buffer's size can be chosen to correspond to sixty images acquired in an integration time corresponding to a time interval of three seconds. Once the circular buffer has been filled, the oldest image is deleted in order to add the most recently extracted image from the video thereto.

The circuitry 2 analyzes the data that is received from the probe 1 and does so in real time. This analysis includes a first calculation 200 that makes it possible to detect the emergence of the fluorescence signal from noise.

The time at which the fluorescence signal begins depends on where the marker is injected. Typically, the signal manifests itself first at a first point that is near the surface and that the fluorescence marker manages to reach after it has entered circulation. The delay between injection of the bolus and the first detectable fluorescence is highly variable and depends on the patient's metabolism. It therefore cannot be predetermined. However, if fluorescence does not occur within a reasonable time, such as thirty seconds, the process is stopped.

A variety of ways are used to detect the beginning of the fluorescent signal's rise.

In one practice, the fluorescence signal is considered to have appeared when upon obtaining, from a pixel or a group of pixels of an image, a fluorescence signal that is greater than or equal to the average level of the intensity corresponding to that pixel or to group of pixels. This average level comes from a reference image. A suitable threshold is thrice the standard deviation of the average level. With Gaussian noise, the probability that the average signal of a pixel will depart from its average value by thrice the standard deviation is low.

The foregoing assumption is considered to be true when for the first images of the acquisition operation for which no real emission of fluorescence is yet present in the image subject to the caveat that the scene and the lighting conditions remain fixed. In such cases, The standard deviation in the value of the signal intensity associated with a pixel or with an average of a group of pixels is obtained by calculating the standard deviation of the signal intensity associated with the pixel or with the average of pixels during the course of several images at the start of the acquisition operation, for example, from ten images.

In another practice, the fluorescence signal is considered to have appeared when, within a pixel or in a group of pixels of an image, a fluorescence signal has an intensity that is greater than or equal to a multiple of the average value of the signal in this pixel or in this group of pixels as calculated in the first few images of the acquisition after the injection of the bolus but before a significant fluorescence signal has been observed in the image. In some embodiments, the first few images is between three and ten images. In some embodiments, the factor for multiplication is three.

The circuitry 2 analyzes the images that are present in a series of first images. In some examples, the series has ten such images. Based on those images, the circuitry calculates an average image $I_{Ref}$. It does so by averaging, for each pixel or group of pixels, over the first ten images of the signal corresponding to the pixel or group of pixels in question. $M_{init}(i,j)$ denotes this average value for a pixel at row i and column j of the image. $M_{init}(k)$ denotes the average value for the kth group of pixels in an image.

The images continue to be transmitted to the circuitry 2 and saved at the frequency F in the circular buffer, which retains only the T most recent images. As this takes place, the circuitry 2 compares the intensities M(i,j) per pixel and/or the intensities M(k) per group of pixels of these images. The circuitry 2 detects the appearance of a signal when the intensity M(i,j) of a pixel or M(k) of a group of pixels in an image exceeds the value $M_{init}(i,j)$ associated with the coordinates of that pixel or $M_{init}(k)$ associated with the kth group of pixels, respectively in the previously averaged image $I_{Ref}$ by a factor of S. In some embodiments, S=3. So, when $M_{(i,j)} > S \cdot M_{init(i,j)}$, time $T_0$ is considered to have been reached and the fluorescence rise is deemed to have started (step 200).

The average image $I_{Ref}$ serves as an original image, i.e. a reference fluorescence image that includes potential autofluorescence, fluorescence or background residues induced by wanted or unwanted excitation, such as lighting of the operating theater for example. This average image $I_{Ref}$ serves as a reference image $I_{Ref}$ that is subtracted from each new fluorescence image $I_i(Y_j)$.

In another practice, the onset of a fluorescence signal is deemed to have occurred upon detecting a signal that is greater than or equal to an average intensity $M_{init}(i,j)$ or $M_{init}(k)$ that has been obtained for a either a pixel or a group of pixels as calculated from the first few images of the acquisition operation to which a offset has been added. A suitable number of images is between three and ten images. A suitable offset is ten. In such practices, the onset of a rise in fluorescence is deemed to have occurred when $M(i,j) > M_{init}(i,j) + S'$. This marks time $T_0$.

In yet other practices, the onset of the fluorescence signal is deemed to have occurred when a signal is obtained that is greater than or equal to an average intensity $M_{init}(i,j)$ or $M_{init}(k)$ as obtained for a pixel or a group of pixels as calculated in the first few images of the acquisition operation offset by a value that corresponds to the number of shades of gray. In a preferred practice, the first three to ten images serve as a basis for calculation and the number of shades of gray is fifteen.

Whichever method is used to identify the onset of fluorescence, once detected, the the fluorescence signal will be sufficient to align the images relative to each other. The circuitry 2 then aligns the newly-acquired fluorescence images with one another. It does so by extracting images from the continuously-filmed video. Standard image-alignment algorithms are used for such alignment, with preference given to those that have at least six degrees of freedom, for rotations and translations, as well as those that use singular points or optical flow.

At time $T_0$, the circuitry 2 carries out a pixel-by-pixel summation of the values of the signal representative of the intensity of the fluorescence emission associated with each pixel and corresponding to a point in the region of the biological tissue 20 being observed. This sum is performed in all of the images $I_t(Y_0)$ stored or pre-stored in the circular buffer (step 300).

The summation is essentially equivalent to integrating the fluorescence signals received at each pixel over a time interval that precedes the starting time $T_0$. In a preferred practices, the preceding time interval is three seconds long.

An alternative practices includes performing the summation over some number of stored images $I_t(Y_0)$. The number of such images is not determined with reference to a time interval $\Delta T$ corresponding to a duration of acquisition. Instead, it is determined with reference to whether or not a percentage of pixels has an intensity that is greater than or equal to a predefined threshold. The various integration methods described herein provide a way to draw attention to those pixels whose intensity values have increased substantially during a time interval. An example of this effect can be seen by comparing FIG. 2A and FIG. 2B.

Figure 2A:
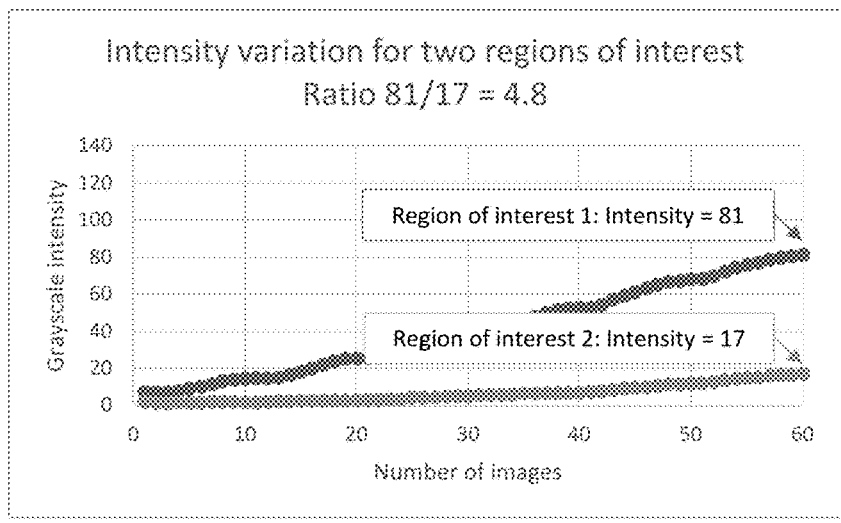
FIG. 2A shows the evolution of the intensity of a fluorescence signal in two different regions of a biological tissue of interest (for example a deep inferior epigastric perforator flap) as successive images are obtained.

FIG. 2A shows the intensities for two first and second fluorescence signals in first and second regions-of-interest in a fluorescence image. The first signal shows a rapid rise in fluorescence. The second signal shows a slower rise.

Figure 2B:
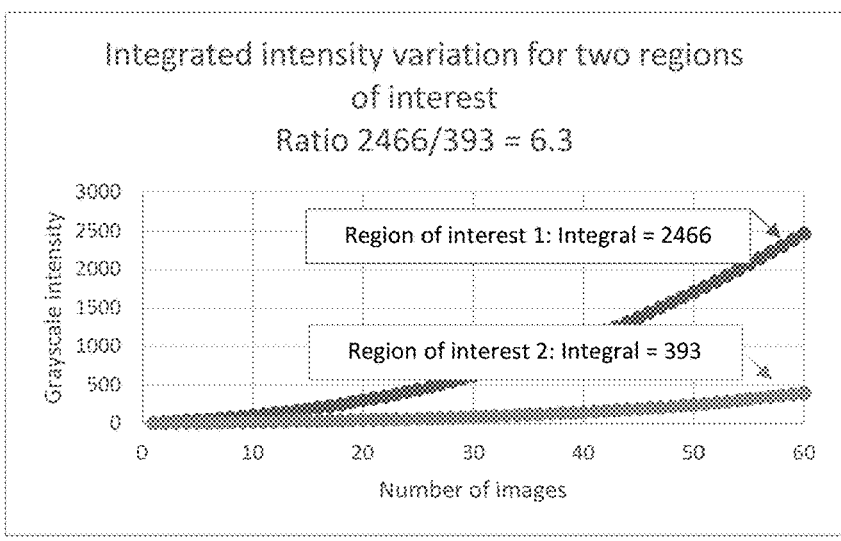
FIG. 2B shows the integral two signals shown in FIG. 2A.

FIG. 2B shows the integrated signals. The integration amounts to determining areas under the signals in FIG. 2A. Thus, as integration proceeds, the integrated signal increases faster than the original signal. This causes a greater the difference between the two curves.

The extent to which this difference grows depends on the integration time or the number of the number of fluorescence images being integrated, which is set forth on the horizontal axes. As is apparent from the figures, the ratio of the two integrals is indeed greater than that between two intensities for a particular value of the abscissa. The integration therefore allows the regions in which fluorescence has risen rapidly over the time interval in which integration is carried out to be highlighted better. With the example shown in FIGS. 2A and 2B, for same abscissa (60), the ratio of the integrated intensity curves is 6.3 whereas the ratio between the two intensity curves is only 4.8.

The procedure continues with normalizing the summed (integrated) fluorescence image $I'(Y_0)$ is then normalized (step 400) by its own maximum in the image (step 400). In some practices, it is useful to remove hotspots before normalization, for example by using a median filter or any other technique. This results in may be applied to remove hotspots before normalization) to obtain a normalized image $I'_{NORM}(Y_0)$.

The normalizing procedure maps the relative intensities of the fluorescence signal associated with each pixel into a scale from 0 to 100%, where 100% corresponds to the relative intensity of the maximum fluorescence signal observed for this image. Making this step automatic, eliminates having the practitioner choose a reference region. This avoids the risk of a choice-based error.

Another practice features normalizing the summed image $I'(Y_0)$ by a predefined threshold value that depends on the image's content. Among these are practices that normalize the image $I'(Y_0)$ by an $x^{th}$ percentile of a histogram of the summed image $I'(Y_0)$. With x equal to 95, this amounts to normalizing the image by the intensity value of a pixel such that 5% of the pixels in the image have an intensity higher than its own.

Yet other practices feature normalizing the summed image $I'(Y_0)$ by a predefined threshold value that is independent of the image's content. Some of these practices feature normalizing the summed image by a threshold value that has been considered to be indicative of a good level of perfusion in a fluorescence image. Such a threshold value can therefore be defined according to conditions of use. Since conditions of use may vary, this permits considerable flexibility.

For example, in this normalization method, it is possible to re-evaluate this value based on variations in the distance between the probe 1 and the surface of the biological tissue 20, based on power fluctuations of the excitation source, based on variations in parameters relating to the camera, such as exposure time, gain, gamma, etc., based on variations in the dosage of the injected marker dose, and based on variations in external lighting. In these practices, the summed image $I'(Y_0)$ is normalized by this threshold value multiplied by the number of summed images in $I'(Y_0)$. By taking all of these parameters into account, it becomes possible to use the apparatus under different conditions without skewing the result. This offers greater reproducibility.

The normalized fluorescence image $I'_{NORM}(Y_0)$ is "thresholded," i.e., compared to a threshold, so as to keep only those pixels that correspond to to a relative intensity of the fluorescence signal that is higher than a predefined threshold value X% (step 600). In a preferred practice, the predefined threshold value is 50%.

The value of the threshold X% corresponds to a value beyond which the user of the apparatus would regard the information as being useful when displayed. The value of the threshold X% corresponds, for example, to a threshold below which the information on fluorescence is not considered to be indicative of a prematurely and/or rapidly increasing signal.

The method continues with calculating the proportion $Y_0$ of the number of pixels corresponding to a relative intensity of the signal that is higher than this predefined threshold value X% (step 800). Potentially, the next proportion to reach $Y_1$ is also determined at this stage, for example $Y_1$ is equal to twice $Y_0$ or $Y_1=Y_0+5\%$. In alternative practices, $Y_1$ is defined before initiating the acquisition operation.

By choosing increasing parameters $Y_0, \ldots, Y_j, \ldots Y_z$ (for example 5%, 10%, 20%, 30%, 40%, 50%), it is possible to control how often a new summed image will be displayed. In particular, choosing the parameters in increasing order causes a new summed image to be displayed only when an increase in the number of pixels exceeding X% has been observed. Each new summation image is therefore displayed when an expansion is observed in the area of the pixels exceeding X% between $Y_j$ and $Y_j+1$.

The increment between successive values of the parameters $Y_j$ and $Y_j+1$ is not necessarily constant. In some practices, it is advantageous better highlight the signal corresponding to perforating vessels at the start of the acquisition operation to and, above all, avoid missing information as a result of having chosen too large an area interval. Thus, one might want to proceed in small increments. For example, one may set $Y_1$ to be equal to $Y_0+5\%$ then $Y_2$ equal to $Y_1+7.5\%$, then $Y_3$ equal to $Y_2+10\%$, then $Y_4$ equal to $Y_3+10\%$, and then $Y_5$ equal to $Y_4+10\%$.

Figure 4:
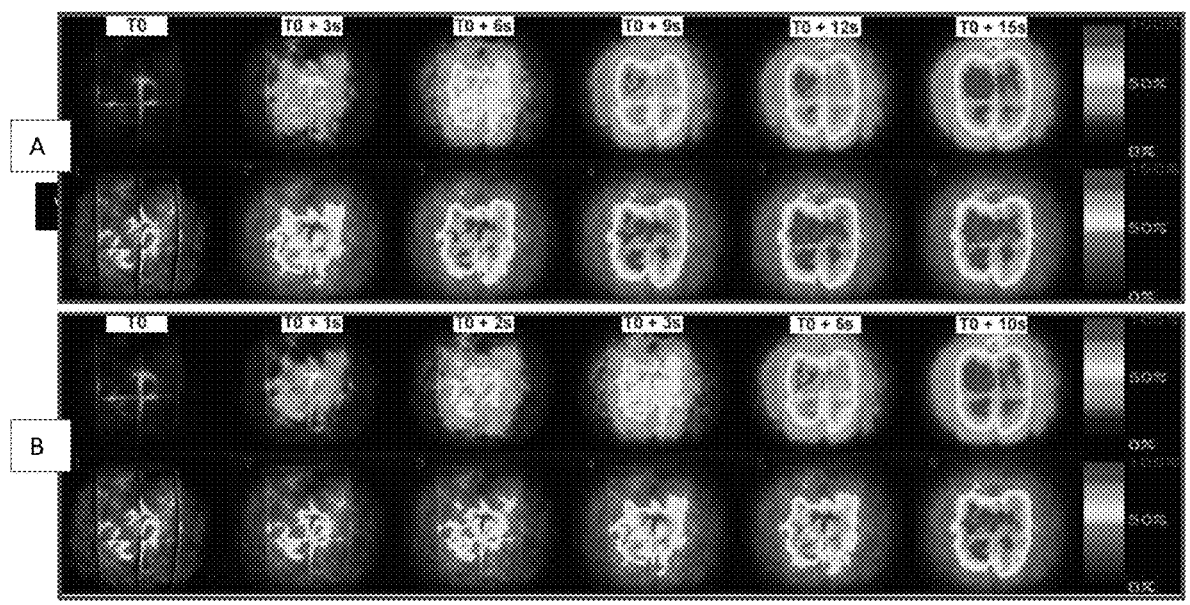
FIG. 4 compares images obtained at predefined time intervals with images obtained at times that have been adaptively determined by observation of changes in diffusion within the images themselves.

Thus, a method as described herein allows the level of perfusion in the region of biological tissue of interest at time $T_0$ and differences in perfusion speed between patients to automatically be taken into consideration. The method also avoids display of redundant images. FIG. 4 shows the enhanced temporal resolution that arises when adaptively displaying images as described herein.

In the first row "A", new images are displayed every three seconds. It is apparent that one has missed a great deal of activity in the first six seconds, when the signal changes quickly. It is also apparent that the images after nine seconds are somewhat less interesting, since nothing is changing significantly. he images at twelve and fifteen seconds are, as a practical matter, redundant.

In the second row "B", images are displayed at times determined by the evolution of the image. In particular, images are displayed at times dictated by when areas of pixels exceed defined intensity thresholds. This results in more frequent images in the first five seconds. It also guaranteed that every new image will have some new information to offer. There are no redundant images. As a result, it is possible to observe the evolution of the fluorescence diffusion with increased temporal granularity near the beginning. This is particularly important for identifying or locating a perforating vessel.

Referring back to FIG. 3, the process continues by colorizing the normalized and thresholded fluorescence image $I'_{NORM}(Y_0)$. This is carried out by applying a color conversion table (step 700). Colorization allows high values of the signal integrals to be emphasized and constitutes a localization aid. The conversion or look-up table can be of a known type. Examples include conversions to false color and conversions that indicate a change to a negative value, etc.

For those cases in which it is produced within the wavelength range to which the first camera is sensitive, the circuitry 2 saves the current image, which corresponds to the starting time $T_0$, aligns it with the other images, and archives it (step 500) for display following the end of the acquisition operation with the subsequent images that will be calculated, for temporal monitoring of the variation in fluorescence. In particular, the normalized and thresholded fluorescence image $I'_{NORM}(0)$ will be superimposed over this current image, which corresponds to the starting time $T_0$.

Following the starting time $T_0$ is a first time $T_1$. The interval between the starting time $T_0$ and the first time $T_1$ depends on the frequency F. At the first time $T_1$, the circuitry 2 retrieves a new fluorescence image $I_i(Y_1)$, aligns it with respect to the image $I(Y_0)$ or $I'(Y_0)$ and sums it directly with the image $I'(Y_0)$ already having been calculated (step 900) to obtain a summed image $I'(Y_1)$. As previously, the summed image $I'(Y_1)$ is normalized to obtain a normalized image $I'_{NORM}(Y_1)$. This normalized image $I'_{NORM}(Y_1)$ is thresholded with respect to the threshold value X%. The proportion $P(Y_1)\%$ of the number of pixels corresponding to a relative signal intensity higher than this predefined threshold value X% is also calculated (step 1000) and compared with the value $Y_1$ defined or determined previously (step 1100).

If the proportion $P(Y_1)\%$ is smaller than the value $Y_1$, the following image $I_i+I(Y_1)$ extracted from the video at the frequency F is aligned and summed like $I(Y_1)$ to obtain a new image $I'(Y_1)$. The image $I'(Y_1)$ resulting from the summation is normalized to obtain a new image $I'_{NORM}(Y_1)$ which is thresholded as previously. The proportion $P(Y_1)\%$ of the number of pixels corresponding to a relative signal intensity higher than the predefined threshold value X% is calculated and compared with the value $Y_1$ defined or determined previously. If necessary, this process is repeated until the proportion $P(Y_1)\%$ of the number of pixels corresponding to a relative signal intensity higher than this predefined threshold value X% is greater than or equal to $Y_1$. The image resulting from these operations is denoted by $I'_{NORM}(Y_1)$.

When the proportion $P(Y_1)\%$ is greater than or equal to the value $Y_1$, the current image is saved and the image $I'_{NORM}(Y_1)$ s colorized for superimposing it over the current image in a manner analogous to the process that was applied to the image $I'_{NORM}(Y_0)$. The process is continued in a similar manner in order to obtain images $I'_{NORM}(Y_j)$; where j is incremented from 1 to Z.

The process continues until the number of normalized images that has been saved is sufficient for analysis of any perforating vessels. As a practical matter, usually six saved images will be enough. At this point, the process ceases.

In some embodiments, the process continues until the acquisition time has reached a particular value, such as about thirty seconds, or when the time between two two consecutive images to be displayed exceeds a time that is considered to be indicative of homogenization of the perfusion. In most cases, this would be on the order of fifteen seconds. The fluorescence signal that comes from a perforated vessel is a transient signal that fades quickly as the marker becomes more homogenously distributed over the entirety of the region of biological tissue. Such is the case, for example, when observing a deep inferior epigastric perforator flap.

According to this practice, it is no longer necessary to fill the circular buffer. This is because each new fluorescence image $I_i(Y_j)$ is summed with the preceding integral of the fluorescence signals. This continues until the end of the acquisition of fluorescence images, which as noted above, has been predetermined for a particular procedure.

In particular, after the starting time $T_0$, each time a fluorescence image $I_i(Y_j)$ is extracted from the video is added to the previous images, the circuitry performs a sequence of operations.

The first operation is that of aligning the extracted image $I_i(Y_j)$ relative to the preceding images, and potentially with the reference image $I_{Ref}$ being subtracted in the process.

The next operation is that of adding the now-aligned fluorescence image to the preceding images to obtain a new integrated image $I'(Y_j)$. This new image corresponds to the sum of the fluorescence images from $T_0-\Delta T$ to $T_j$. In the illustrated example, the interval $\Delta T$ is three seconds.

The next step is that of normalizing the integrated image $I'(Y_j)$ is normalized with respect to the maximum intensity obtained in this image $I'(Y_j)$. This results in the normalized image $I'_{NORM}(Y_j)$.

The next step is to compare the intensity of each pixel in the integrated and normalized image $I'_{NORM}(Y_j)$ with a threshold intensity.

The foregoing comparison results in determination of a proportion $P(Y_j)\%$ of pixels, the associated intensity of which, after integration and normalization, is higher than the percentage X%. The circuitry 2 then compares the resulting proportion is compared with a value $Y_j$. If $P(Y_j)\%$ is greater than or equal to $Y_j$, the circuitry 2 colorizes and archives the normalized image $I'_{NORM}(Y_j)$. Otherwise, the circuitry 2 continues to add images $I_i(Y_j)$ to the preceding images until a normalized image $I'_{NORM}(Y_j)$ having a proportion $P(Y_j)\%$ greater than or equal to $Y_j$ is obtained. The circuitry 2 also archives the current image, which corresponds to time $T_j$ at which the last image $I_i(Y_j)$ was extracted from the video.

After having obtained a set of normalized images ($I'_{NORM}(Y_j)$, where j=0 to Z) representative of the phenomenon being studied is obtained, the circuitry 2 causes the colorized images $I'_{NORM}(Y_j)$ to be displayed with each such colorized image being superimposed over the corresponding current image (step 700).

As a result, the only images $I'_{NORM}(Y_j)$ that are actually displayed are those that feature a diffusion area in which there exists a percentage $P(Y_j)\%$ of pixels that is greater than or equal to $Y_j\%$. A level of relative intensity higher than X% is set to determine if a pixel should be considered in the calculation of the diffusion area.

Fluorescence images are therefore constantly being extracted from the video at a frequency F and transmitted to the circuitry 2, which then proceeds to align the incoming images and to continuously sum them to form integrated images. However, only those integrated images that correspond to determined areas of diffusion of the fluorescent product in the region of biological tissue of interest are actually colorized and stored.

The circuitry 2 archives Z images in this way. In illustrated example, there are six such archived images. These six images correspond to $Y_0$=5% of area, $Y_1$=10% of area, $Y_2$=20% of area, $Y_3$=30% of area, $Y_4$=40% of area and $Y_5$=50% of area, respectively. These images are calculated and archived at a rate that depends on how fast the marker actually diffuses in a particular patient and not on predefined time intervals. These images are shown along the bottom row of FIG. 5.

In some practices, the circuitry 2 carries out the steps of extracting a fluorescence image $I_i(Yk)$ from the video; aligning the fluorescence image $I_i(Yk)$, including possibly subtracting, from that image, a reference image $I_{Ref}$; summing the fluorescence image $I_i(Yk)$ with the sum of the fluorescence images that have already been calculated (for example from $T_0$-$\Delta T$ to $T_{k-1}$, i.e. from $T_0$-3 seconds to $T_{k-1}$ for the example presented above) to obtain a new integrated fluorescence image $I'(Yk)$; normalizing the integrated image $I'_{NORM}(Yk)$; counting how many of the pixels of the normalized image have a signal intensity that exceeds a predefined threshold; determining the proportion $P(Yk)\%$ of pixels that are above this threshold; colorizing the normalized image; storing the resulting colorized image, with the proportion of pixels that are above the threshold, associated with this image; and storing the current image obtained concomitantly with the extraction of the image $I_i(Yk)$ from the video.

This practice of the method thus results in having an infrared camera capture a video of fluorescent images and extracting of fluorescence images from the video at a frequency F. The resulting data is transmitted to the circuitry 2, which aligns the images and sums them continuously, normalizes, colorizes, and stores the resulting images. However, not all of the images $I_i(Yk)$ are archived in association with the proportion $P(Yk)\%$ of pixels, the associated intensity of which, after integration and normalization, is higher than the percentage X%, i.e. with a quantity representative of the corresponding diffusion area. The choice of images to be displayed is made later, by selecting the diffusion areas that are deemed relevant for the particular application.

Another practice proceeds in a similar manner except that alignment and summation of images occurs at the end of the acquisition process, before being normalized, colorized and stored.

In addition, at the end of the acquisition operation, the circuitry 2 analyzes all of the Z archived current images (in the case that these are taken in the range of wavelengths detected by the fluorescence camera). The circuitry 2 determines the maximum of the value of the signal representative of the intensity of the fluorescence emission associated with each pixel in all of these images. The circuitry 2 normalizes each image with respect to this maximum. The circuitry 2 colorizes each image thus normalized using a different color conversion table than that for summed (integrated) fluorescence images.

All of the summed (integrated) fluorescence images and all of the current images obtained and stored are displayed together on a screen (FIG. 5), for example in the form of two horizontal strips: the images corresponding to the various percentages of the diffusion area relative to the entire area of the region of biological tissue being observed (for the example illustrated: $Y_0$=5% of area, $Y_1$=10% of area . . . $Y_5$=50% of area) being positioned one above the other, respectively.

The bottom row corresponds to an example of fluorescence images obtained after the processing mentioned above. For greater clarity, a see-through effect is provided by way of example by colorizing only those values of the signal which correspond to more than X%=50% of the maximum value of this signal (it is possible to use other values of X%, X%=30% for example may be considered for certain applications). For example, the signals corresponding to 50% of this maximum correspond to the color yellow, the signals corresponding to 70% of this maximum correspond to the color orange and the signals corresponding to 90% of this maximum correspond to the color red. Conversely, the values of the signal which correspond to less than X%=50% of the maximum value of this signal remain in grayscale (alternatively, these values may be displayed in a see-through manner in the current image or in the reference image $I_{Ref}$ in grayscale). This type of representation makes it possible to highlight, for the practitioner, the regions of the region of biological tissue being observed in which the rise of the fluorescence signal is faster. Thus, the practitioner may visually better identify and locate potential perforators.

Figure 5:
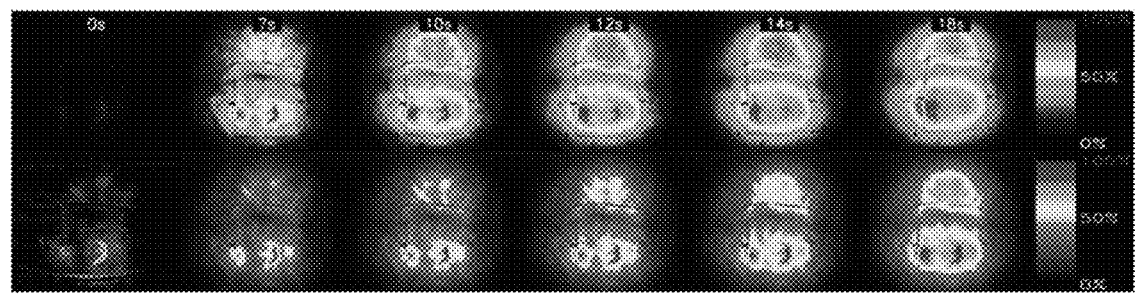
FIG. 5 shows examples of displayed results.

A representation of the type corresponding to the top row in FIG. 5 makes it possible to highlight, for the practitioner, the state of perfusion of the entire region of biological tissue being observed. Thus, the practitioner may visually identify potential perfusion problems.

More generally, the images resulting from normalization and colorization may either be displayed as they are, or in a see-through manner over the current image or over the reference image $I_{Ref}$.

Thus, the signals below a threshold are left in grayscale, replaced by the grayscale of the current image or by the grayscale of the reference image $I_{Ref}$, or displayed in a see-through manner over the current image or over the reference image $I_{Ref}$.

The circuitry 2 also allows the practitioner (if the camera has either not moved or moved only a little) to superimpose, preferably in a see-through manner, a normalized fluorescence image, or vignette, which is colorized (for example by superimposing only the colorized pixels, i.e. corresponding to values of the signal corresponding to more than X% of the maximum value of this signal, for example where X%=50%) over the "direct" or context image (also referred to as the "live" image) corresponding to an image obtained by illuminating the region of biological tissue to be observed using light-emitting diodes emitting in the range of wavelengths to which the camera is sensitive (for example, the near infrared), or else using the excitation light since, at the end of perfusion, the fluorescence is generally homogeneous. This constitutes an aid in locating perforators. The vignettes obtained toward the beginning of perfusion (see also FIGS. 6 and 7) allow more accurate localization, because, at the end of the acquisition operation, with the tissue being generally perfused properly and homogeneously, the fluorescence is distributed over the entirety of the region of tissue being observed.

Figure 6:
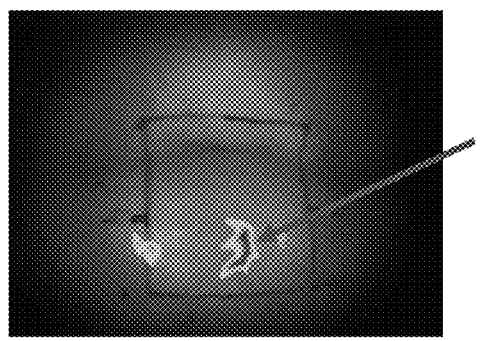
FIGS. 6 and 7 show regions corresponding to perforators.

In the present example, if the practitioner wishes to superimpose the second vignette starting from the left on the bottom row of FIG. 5 over the "direct" image, the circuitry 2 allows them to superimpose it in a see-through manner over the "direct" image, thus obtaining the image corresponding to FIG. 6 in real time. They may then directly point out the perforator, in the region of biological tissue being observed, with a pen/stylus, to mark the location of this perforator (see the arrow in FIG. 6).

Figure 7:
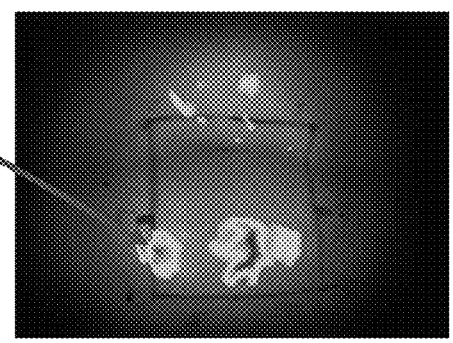

If the practitioner wishes to superimpose the third vignette starting from the left on the bottom row of FIG. 5 over the "direct" image, the circuitry 2 allows them to superimpose it over the "direct" image, thus obtaining the image corresponding to FIG. 7 in real time. They may then locate a second perforator which can be used to perfuse another half of a deep inferior epigastric perforator flap for example (see the arrow in FIG. 7).

Displaying several vignettes avoids imposition of a result on the practitioner. As a result, the practitioner is able to choose an image according to the action that the practitioner wishes to perform and the information that the practitioner wishes to have. Displaying all of the images provides the practitioner with a visual representation of a dynamic variation.

A method as described herein permits a practitioner to view images instead of curves. This promotes the practitioner's ability to interpret the data. The ability to colorize the images further promotes such interpretation by highlighting those parameters that are important. The method as described herein also makes it possible to highlight specific parameters of signals associated with perforators. Such signals have a tendency to climb rapidly to a high intensity and to fade quickly. The method as described herein permits temporal observations that are close enough to each other to achieve the granularity required to observe such transient phenomena. This permits detailed observation of perforators that cannot be done when not enough samples are obtained during the brief interval in which a perforator manifests itself.

More generally, the methods disclosed herein enable comparison of at least two successive images in a sequence, but preferably several successive images in a sequence, may be compared, in order to be interpreted visually by a practitioner, on the basis of information presented in the form of images or vignettes. The parameters required for this interpretation are directly highlighted in the images and by visual comparison of the images. The fluorescence (and therefore perfusion) diffusion dynamics are visible by superposition (overlay or transparency) with a "direct" image of the area of biological tissue being studied, in order to precisely locate the areas in this tissue where the signal rises first and faster. The images are aligned with respect to one another automatically, which allows more reliable results to be obtained. Notably, scenes which may change slightly over time (for example due to the movement of a deep inferior epigastric perforator flap with breathing) can be observed.

In a preferred implementation, the circuitry 2 automates the acquisition of results, thus eliminating the need for the surgeon's intervention. Eliminating such intervention eliminates human error that may arise from having chosen incorrectly or sub-optimally, thus reducing interpretation errors and promoting reproducibility of measurements.

The method and device as described herein also makes it possible to accommodate scenes that may move slightly over time.

An advantage that arises from the display of a direct image in real time is that doing so promotes a surgeon's ability to navigate through a surgical field with few or no anatomic landmarks. This is particularly useful when searching for perforators. Moreover, diffusion of the marker happens quickly. Within a few seconds, the signal becomes too homogeneous to identify features of interest. The ability to view the evolution of the signal in real time beginning with the onset of fluorescence thus promotes a surgeon's ability to recognize transient phenomena.

In the implementation described in connection FIG. 3 includes summing a single additional image with those already summed. Alternative practices of the method feature aligning several acquired fluorescence images with one another and summing them as a unit with those already summed.

Some practices of the method include associating, at a time $T_i$, a series of n fluorescence images, where n=1 to N, that are captured using the fluorescence camera in a time interval $\Delta T_i$, dependent on the area covered by pixels, the value of which is higher than a given threshold, associating, at a time $T_j$ after the time $T_i$, a series of m fluorescence images, where m=1 to M, that are captured using the infrared camera in a time interval $\Delta T_j$, also dependent on the area covered by pixels, the value of which is higher than a given threshold, and mutually aligning the n and m fluorescence images acquired and associated with time $T_i$ and $T_j$, respectively.

Then, firstly, the n fluorescence images associated with time $T_i$ and aligned are summed with one another, pixel by pixel, to obtain a fluorescence image $I(Y_i)$, which is next itself summed with an image obtained by summing images captured at times prior to $T_i$, the resulting image then corresponding to an image $I'(Y_i)$.

Secondly, the m fluorescence images associated with time $T_j$ and aligned with one another are summed with one another, pixel by pixel, to obtain a fluorescence image $I(Y_j)$. It should be noted that, in the implementation example described above, m=1 and $I(Y_j)$ corresponds to only one fluorescence image.

The fluorescence images $I'(Y_i)$ and $I(Y_j)$ are next summed to obtain a summed fluorescence image $I'(Y_j)$.

This image is normalized to give $I_{NORM}(Y_j)$. Next, it is thresholded and if the percentage $P(Y_j)\%$ of pixels corresponding to a signal intensity above a threshold X% has changed sufficiently in comparison with what it was for the image $I'_{NORM}(Y_i)$, the image $I'_{NORM}(Y_j)$ is colorized with a view, for example, to superimposing (overlaying) it over a direct image viewed by the camera. For example, this direct image is the image captured in real time or the direct image captured at $T_j$. A see-through effect may be obtained by weighting the RGB channels, making it possible to retain a certain percentage of the values of these channels in the direct image, to which the additional percentage to make up 100% of the colorization determined previously is added. This see-through effect is used to advantage to see the surgeon's instrument or pen/stylus through the see-through image (overlay).

When reference is made in the preceding paragraphs to times $T_i$ and $T_j$, it is primarily to specify the time order of image acquisition, but the relevant parameter to which reference is made as information useful for the practitioner is the number of pixels representing a signal value higher than or equal to a certain threshold. In other words, the useful information is linked to the area of biological tissue in which the diffusion of the marker can be observed.

The method as described herein automatically accounts for the variability between patients in order to facilitate access to the relevant information and to optimize the interpretation of the information relating to the dynamics of diffusion of the fluorescence signal for practitioners. The analysis of this information is very straightforward since it is based mainly on images and is easily localizable in the patient.

It should be noted that both an increase in the percentage of pixels corresponding to a signal intensity above the threshold and a decrease in this percentage may be of interest. Monitoring an increase in this number of pixels may be useful for characterizing the appearance and diffusion of the fluorescent marker in the region of biological tissue being studied. Monitoring the decrease in this number of pixels may be useful for other applications (for example for quantifying the removal of fluorescent tracer and evaluating venous return).

As used herein, the verb "to sum" and its various cognates, such as "summation" or "sum" correspond to simple sums (for example $I(Y_i)+I(Y_j)$), weighted sums (for example a $I(Y_i) +bI(Y_j)$, where a and b are weighting factors that could notably emphasize that the image $I(Y_i)$ comes first with respect to image $I(Y_j)$, etc.), pixel-weighted sums (for example to give more weight to the pixels corresponding to rapid variations in intensity between consecutive images), in this case the variation per pixel between two consecutive images is studied and a weighting matrix is constructed so as to give more weight to the pixels which have experienced the greatest increases in intensity between the two images, and a sum of the differences in intensity per pixel between two images, etc.

The invention claimed is:

1. A method for monitoring diffusion of a fluorescent marker within a region of biological tissue, said method comprising:
    using a camera, acquiring fluorescence images from said region, wherein each of said fluorescence images corresponds to a set of pixels, wherein a value of a fluorescence signal is associated with at least certain ones of said pixels, and wherein said value represents an intensity of fluorescence emission from said region;
    during perfusion of said fluorescent marker, measuring diffusion areas, each corresponding to a number of pixels associated with a signal greater than or equal to a predetermined or precalculated signal threshold, in at least two of said acquired fluorescence images, said diffusion areas being areas in which said marker has diffused;
    comparing said diffusion areas by determining a variation, between said at least two of said acquired fluorescence images, in the percentage of the number of pixels associated with said signal greater than or equal to said predetermined or precalculated signal threshold; and
    based on said comparison, automatically determining that a change in said number of pixels associated with a signal greater than or equal to said predetermined or precalculated signal threshold, has reached a percentage threshold sufficient for at least a portion of one of said two acquired images to be displayed.

2. The method of claim 1, wherein measuring said diffusion areas comprises calculating how many pixels have an intensity of fluorescence emission that is higher than a predefined threshold, said signal intensity being derived from said value of said fluorescence signal.

3. The method of claim 1, wherein measuring said diffusion areas comprises calculating a proportion of pixels in said region that have a signal intensity that is higher than a predefined threshold, said signal intensity being derived from said value of said fluorescence signal.

4. The method of claim 1, further comprising determining that there has been a change in diffusion of said marker within said tissue, wherein determining that there has been a change in said diffusion comprises determining that a diffusion area in one of said two acquired images has become changed relative to a predefined value.

5. The method of claim 4, wherein determining that there has been a change comprises determining that there has been a decrease in diffusion of said marker within said tissue, wherein determining that there has been a decrease in said diffusion comprises determining that a diffusion area in one of said two acquired images has become less than or equal to a predefined value.

6. The method of claim 1, wherein a starting time is defined as a time at which diffusion has become observable, wherein said value is calculated by integration of values in each of said pixels during an interval that begins at said starting time.

7. The method of claim 6, further comprising, after having calculated said value, normalizing said value.

8. The method as claimed in claim 7, further comprising, after having normalized said value, comparing said value with a threshold.

9. The method of claim 8, wherein an extent to which said marker has diffused is changing and wherein measuring diffusion areas comprises measuring a proportion of pixels that have an intensity that has changed relative to a predefined value.

10. The method of claim 9, wherein an extent to which said marker has diffused is increasing and wherein measuring diffusion areas comprises measuring a proportion of pixels that have an intensity that is greater than or equal to a predefined value.

11. The method of claim 1, further comprising transmitting an image series captured by said camera to a computer and causing said computer to generate a first summed image by carrying out a pixel-by-pixel summation of all images in said series, to carry out pixel-by-pixel summation of said first summed image with a second summed image, said second summed image having been previously generated, thereby generating a third summed image, in at least a portion of said third image, determining a proportion of pixels have a value that exceeds a predefined threshold, determining that said proportion has crossed a predefined value, and archiving said third image as a result of having determined that said proportion has crossed said predefined value, wherein crossing said predefined value includes both said proportion having increased beyond said predefined value and said proportion having decreased to below said minimum value.

12. The method of claim 11, further comprising normalizing said third summed image prior to archiving said third image, wherein normalizing said third summed image comprises normalizing said third summed image relative to a maximum intensity of said fluorescent signal, whereby signal values in said normalized image are between 0% and 100% inclusive and whereby said normalized image is archived.

13. The method of claim 12, wherein said normalized image is one of first and second normalized images that are processed to be viewed simultaneously, said method further comprising displaying said normalized images simultaneously.

14. The method of claim 12, further comprising displaying a direct image of said region and superimposing said normalized image over said direct image such that said region remains visible through said normalized image.

15. The method as claimed in claim 14, wherein superimposing said normalized image comprises displaying only those portions from said normalized image that have signal values that are in excess of a predefined percentage of said maximum intensity of said fluorescent signal.

16. The method of claim 1, further comprising calculating an average intensity for at least a portion of a first fluorescence image and comparing said average intensity to a corresponding average intensity calculated for a corresponding portion of an original fluorescence image to determine a threshold, wherein emission of fluorescence from said region of said threshold is indicative of an effect from perfusion of said marker.

17. An apparatus for monitoring diffusion of a fluorescent marker within a region of biological tissue, said apparatus comprising:
  a camera for acquiring fluorescence images from said region, wherein each of said fluorescence images corresponds to a set of pixels, wherein a value of a fluorescence signal is associated with at least certain ones of said pixels, and wherein said value represents an intensity of fluorescence emission from said region;
  means for measuring diffusion areas, each corresponding to a number of pixels associated with a signal greater than or equal to a predetermined or precalculated signal threshold, in at least two of said acquired fluorescence images during perfusion of said fluorescent marker, said diffusion areas being areas in which said marker has diffused;
  means for comparing said diffusion areas by determining a variation, between said at least two of said acquired fluorescence images, in the percentage of the number of pixels associated with said signal greater than or equal to said predetermined or precalculated signal threshold; and
  means for automatically determining, based on said comparison, that a change in said number of pixels associated with a signal greater than or equal to said predetermined or precalculated signal threshold, has reached a percentage threshold sufficient for at least a portion of one of said two acquired images to be displayed.

18. The apparatus as claimed in claim 17, further comprising an optical sensor for detecting visible light and capturing a direct image over which a fluorescence image resulting from at least one step of summing with one or more other images has been superimposed.

* * * * *